Aug. 4, 1964
R. ADAMS
3,142,928
FISHING LURES
Filed Dec. 28, 1961
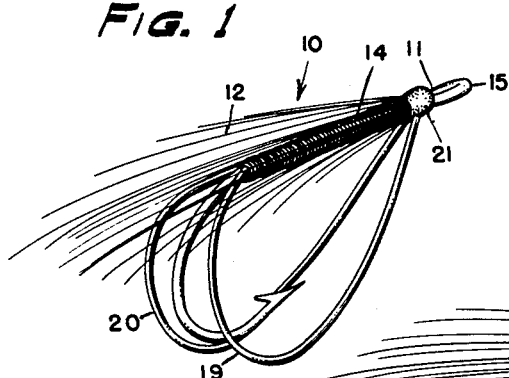
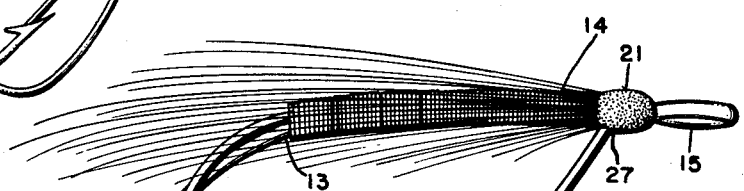
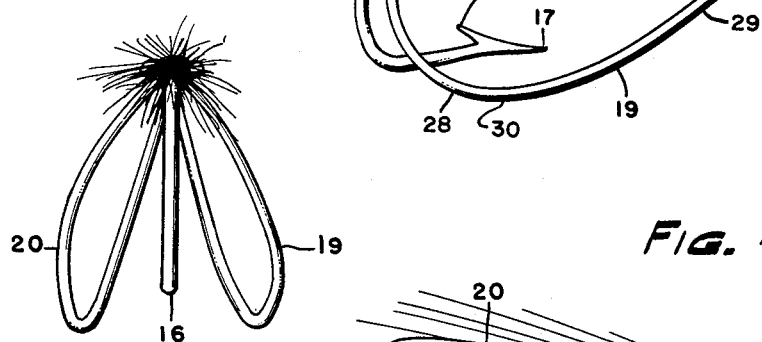
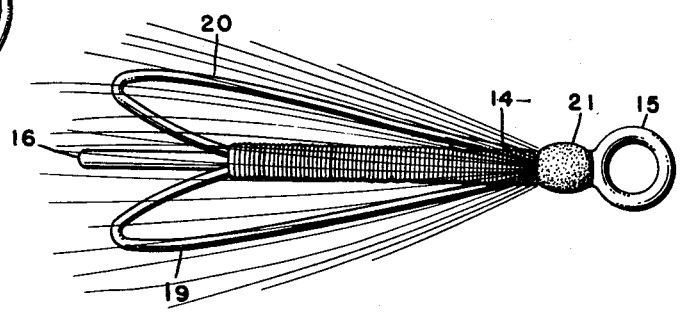
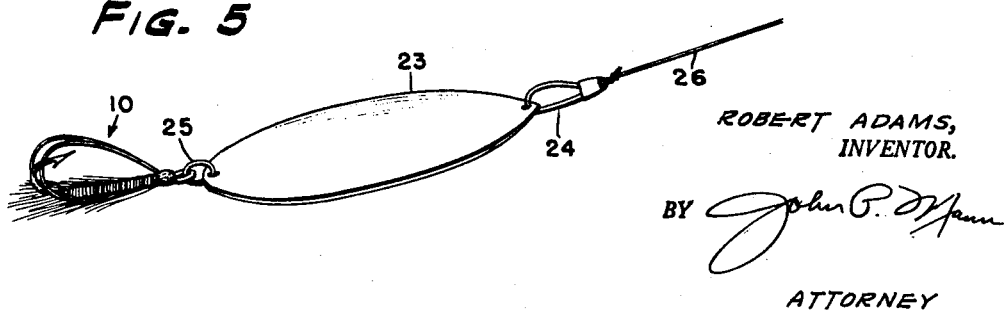
ROBERT ADAMS,
INVENTOR.
BY
ATTORNEY United States Patent Office 3,142,928
Patented Aug. 4, 1964

3,142,928
FISHING LURES
Robert Adams, Box 123, Wittenberg, Wis.
Filed Dec. 28, 1961, Ser. No. 162,755
4 Claims. (Cl. 43—43.4)

The present invention relates, in general, to fishing lures and more particularly is directed to such a lure having a means for preventing the hooks on the lure from becoming entangled in weeds.

One of the greatest problems of fishermen is to successfully pull fishing lures through waters having concentrations of weeds. Unless some means is provided to deflect the weeds they are caught by the hook and accumulate to preclude any possibility of catching a fish thereon. Heretofore lures have been equipped with weed deflectors or guards consisting of metal whiskers which extended rearwardly from the front of the hook and diverge on either side of the sharp, barbed hook end. However, these metal whiskers also effectively prevent the hook from piercing the mouth of a fish. This phenomenon occurs because of the relatively high stiffness of metals, which require relatively high forces to deflect the whiskers having diameters which are practical. When whisker diameters are reduced to provide sufficient deflection for a given force, the stresses are high enough to exceed the elastic limit of the metal and permanent deformation of the whisker occurs.

The present invention overcomes the deficiencies of weedless lures used heretofore by providing the following structure. The hook used with the lure is provided with a pair of looped, low stiffness guards each emanating from a point near the front of the shank of the hook and extending in planes diverging at relatively small angles from the plane of the hook. These loops, consisting of a first portion 29, a middle portion 30 and a rear portion 31, continue to a point below the sharp, barbed hook end and then curve back to terminate at points toward the rear of the hook shank. Preferably these loops do not extend rearwardly as far as the rearmost portion of the hook itself. The material used for these filaments should have a modulus of elasticity in a range from 50,000 to 600,000 pounds per square inch.

The primary object of my invention is to provide a weedless fishing lure having the capacity to deflect weeds but which will not prevent the hooking of a fish.

A further object of this invention is to provide a weedless fishing lure which is simple in construction and capable of inexpensive manufacture.

Other objects and advantages of my invention will be understood from the following description and claims in conjunction with the accompanying drawings which show by way of example preferred embodiments of the invention and in which:

FIGURE 1 is a perspective view of my invention showing the relative disposition of the parts.

FIGURE 2 is a side view of the lure shown in FIGURE 1 and shows the relationship of the weedless guards to the hook.

FIGURE 3 is an end view from the rear of the invention shown in FIGURE 1.

FIGURE 4 is a top view of the invention.

FIGURE 5 is a perspective view of the invention showing how it would be used with a spoon type bait.

Referring now to the drawings, the fishing lure described herein and shown generally by numeral 10 can be of the type having a body depicting any type of marine creature commonly used for attracting fish or can be provided with a common fish hook 11 having a hackle 12 bound to the shank 13 of hook 11 with a binding 14. This hackle material can be any material capable of attracting fish, such as fur from the tail of a deer or squirrel. The hook 11 is additionally provided with an eye 15 on the forward end of shank 13, a curved portion 16 and sharp end 17 with a barb 18.

The weed guards 19 and 20, as best shown in FIGURES 1 and 2, comprise a pair of looped filaments each emanating from a point 27 near the front of hook shank 13 and secured thereto by a cement 21 such as a polyester or epoxy adhesive. Each guard loop then proceeds to a point 28 below the sharp end 17 of hook 11 and continues its curve to a point 22 which is not as far to the rear of the lure as the curved portion 16 of the hook 11. The guards 19 and 20 lie in planes which diverge at relatively small angles from the plane including the shank 13 and sharp end 17 of the hook 11. This angle can vary from a value which would bring the guard immediately adjacent the hook or could be as great as approximately 30 degrees, but I prefer an angle between 10 and 15 degrees.

Each guard then terminates at a point near the end of shank 13 and is held in place by the binding 14. Binding 14 consists of a circularly wound wire preferably made of stainless steel although a plastic filament could also be used.

The material from which the looped guard consists is preferably a monofilament plastic material which may have a modulus of elasticity of between 50,000 pounds per square inch and 600,000 pounds per square inch although a range between 300,000 pounds per square inch and 450,000 pounds per square inch is preferred. The definition of this modulus is "The tensile stress applied to the object expressed in pounds per square inch divided by the elongation in inches per inch." The value of this modulus for steel is 30,000,000 pounds per square inch and for aluminum 10,000,000 pounds per square inch. I have found that the stiffness of metals as expressed by elasticity moduli in the millions requires forces greater than the striking force of fish in order to deflect metallic guards. However, plastic filaments having elastic moduli in the order of 50,000 to 600,000 pounds per square inch and, preferably between 300,000 and 450,000 pounds per square inch provide stiffnesses which will allow the lure to move through weeded areas without catching weeds but which will easily deflect under the force of a striking fish. Some of the plastic materials which will provide the desired elastic moduli are nylon, polyethylene and polypropylene.

Use of the plastic aforesaid has been found to be too flexible to extend a single whisker rearwardly in the manner formerly used with metals. Therefore, a more rigid means of mounting the guard is provided by my invention wherein a loop extends from near the front of the hook shank and returns to be secured to the rear of said shank.

A desired feature of my invention is to provide the looped guard so that it does not extend rearwardly beyond the rearmost portion of the hook. This loop position prevents light force from pushing the looped guard on one side of the hook past the hook toward the opposite side thereof. Unless the loop on one side of the hook is made to bear against the hook in this manner only the torsional resistance of the plastic filament would prevent a weed from pushing the weed guard aside and catching on the hook.

In use this lure can be cast as a separate bait with either fly casting or spin casting equipment, or, as shown in FIGURE 5 can be attached to a spoon 23 with a ring 25 for casting with a plug casting rig. As my weedless hook passes through weeded areas the guard filaments touch the vegetation before the sharp pointed hook allowing the lure to move sideways and avoid snagging. However, with the force of a striking fish the guard filaments bend easily to the side to expose the hook thus catching the fish.

It will be apparent to those skilled in the art that various changes and modifications may be made in the embodiments described and illustrated without departing from the scope of the invention as defined in the appended claims. It is intended, therefore, that all matter contained in the foregoing description and in the drawings shall be interpreted as illustrative only and not as limitative of the invention.

I claim:

1. A fishing lure comprising a hook having a shank, a line attaching means near the forward end of said shank, a rearmost curved section and a sharp, barbed end; a first continuous guard loop on one side of said hook having a first portion extending outwardly from a position near the front of said hook shank, a middle portion being spaced radially further from said shank than the sharp, barbed end thereof, and a rear portion extending outwardly from a position approximately at the rear of said shank into the region between the sharp end of said hook and the rearmost curved section of said hook; a second continuous guard loop disposed on the side of the hook opposite said first guard loop and having a first portion extending outwardly from a position near the front of said hook shank, a middle portion being radially further from said shank than the sharp, barbed end thereof and a rear portion extending outwardly from a position approximately at the rear of said shank into the region between the sharp end of said hook and the rearmost curved section of said hook, and a joining means to fixedly fasten the first and rear portions of said guard loops to the said hook shank.

2. The device of claim 1 wherein the guard loops comprise a material having a modulus of elasticity in a range from 300,000 pounds per square inch to 450,000 pounds per square inch.

3. The device of claim 1 wherein the said joining means comprises a circularly wrapped wire binding.

4. The device of claim 1 wherein the guard loops comprise a material having a modulus of elasticity in a range from 50,000 pounds per square inch to 600,000 pounds per square inch.

References Cited in the file of this patent

UNITED STATES PATENTS

| | | |
|---|---|---|
| 668,066 | Strong | Feb. 12, 1901 |
| 1,457,373 | Kessel | June 5, 1923 |
| 2,168,476 | Hartung | Aug. 8, 1939 |
| 2,298,811 | Sisco | Oct. 13, 1942 |
| 2,620,587 | Green | Dec. 9, 1952 |
| 2,641,081 | Moore | June 9, 1953 |
| 2,768,466 | Reed | Oct. 30, 1956 |
| 2,774,169 | Matz | Dec. 18, 1956 |
| 2,917,860 | Norton | Dec. 22, 1959 |